(12) United States Patent
Chittimalla, Jr. et al.

(10) Patent No.: US 9,680,956 B2
(45) Date of Patent: Jun. 13, 2017

(54) METHOD AND APPARATUS FOR PREDICTIVE ANALYSIS FOR PRE-FETCHING DATA

(71) Applicant: Bank of America Corporation, Charlotte, NC (US)

(72) Inventors: Eashwar Chittimalla, Jr., Charlotte, NC (US); Karl W. Moehlenkamp, Charlotte, NC (US); Michael F. X. Ware, Wilbraham, MA (US)

(73) Assignee: Bank of America Corporation, Charlotte, NC (US)

( * ) Notice: Subject to any disclaimer, the term of this patent is extended or adjusted under 35 U.S.C. 154(b) by 402 days.

(21) Appl. No.: 14/187,811

(22) Filed: Feb. 24, 2014

(65) Prior Publication Data
US 2015/0242756 A1    Aug. 27, 2015

(51) Int. Cl.
*H04L 29/08*    (2006.01)
(52) U.S. Cl.
CPC .......... *H04L 67/2847* (2013.01); *H04L 67/18* (2013.01)
(58) Field of Classification Search
None
See application file for complete search history.

(56) References Cited

U.S. PATENT DOCUMENTS

| 8,494,995 B2 | 7/2013 | Deshpande et al. |
| 2012/0246257 A1* | 9/2012 | Brown .............. G06F 17/30902 709/213 |
| 2013/0080617 A1 | 3/2013 | Driesen et al. |

OTHER PUBLICATIONS

Bensinger, Greg, "Amazon Wants to Ship Your Package Before You Buy It," The Wall Street Journal, Jan. 17, 2014.

* cited by examiner

*Primary Examiner* — Gary W Cygiel
(74) *Attorney, Agent, or Firm* — Weiss & Arons LLP; Michael A. Springs, Esq.

(57) ABSTRACT

One or more non-transitory computer-readable media storing computer-executable instructions which, when executed by a processor on a computer system, perform a method for predictive analysis for determining which data to pre-fetch at a specific point in time. The method may include generating a prediction corresponding to a user login to a webpage. The prediction may include a user identification, a start time, an end time, and a probability of user login. The method may also include pre-generating and pre-fetching, in response to the prediction, data for at least part of a user login webpage. The method may also include storing the data in a cache memory. The method may also include updating the data stored in the cache memory.

12 Claims, 6 Drawing Sheets

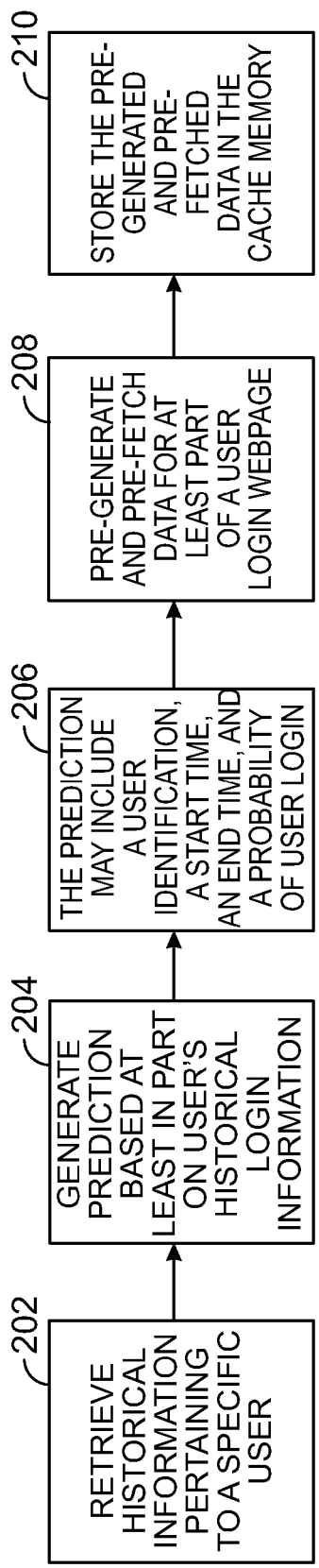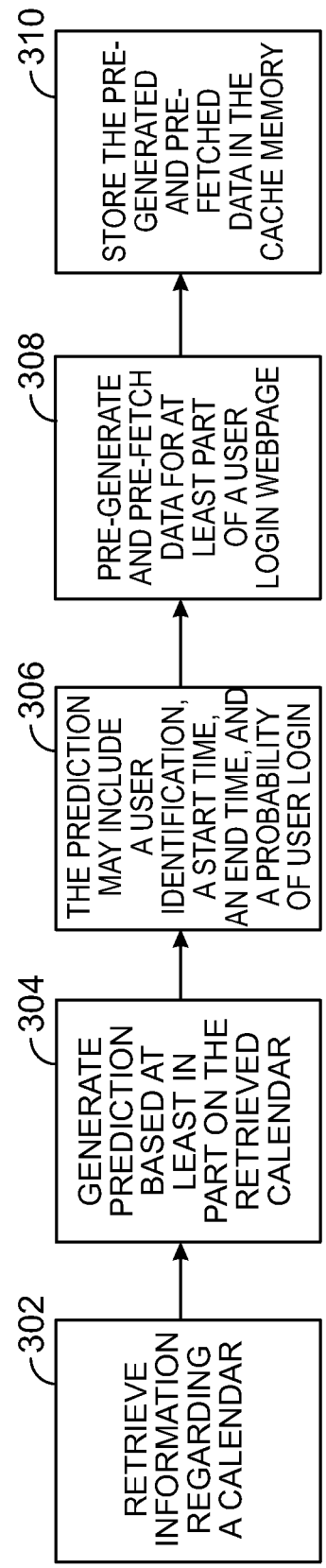

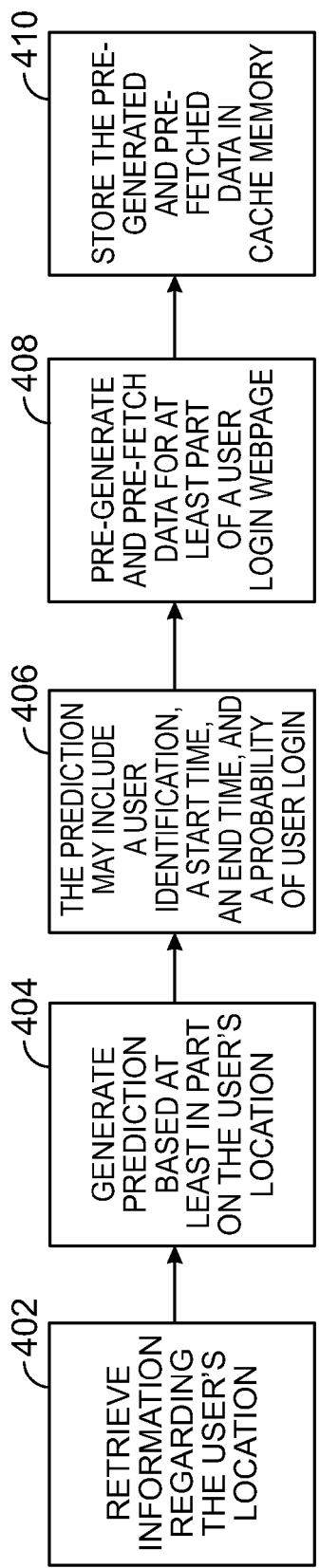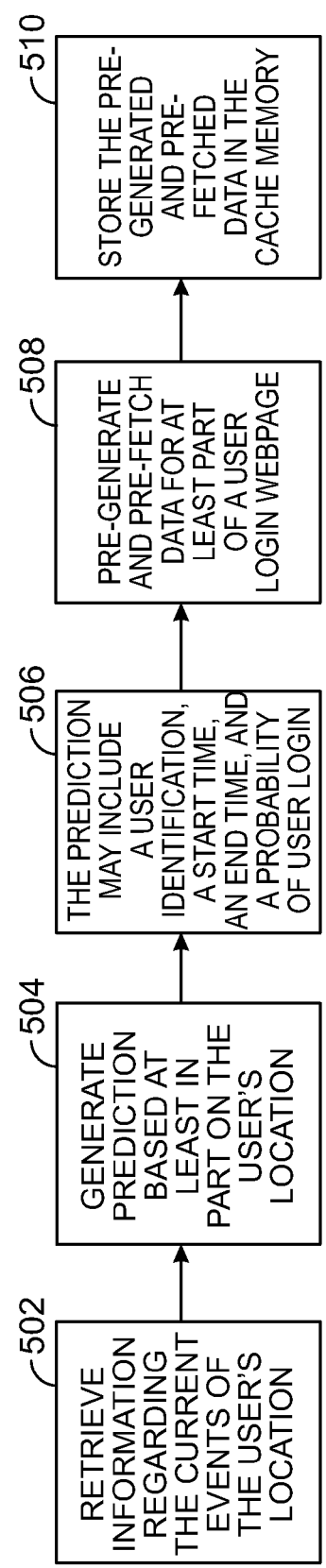

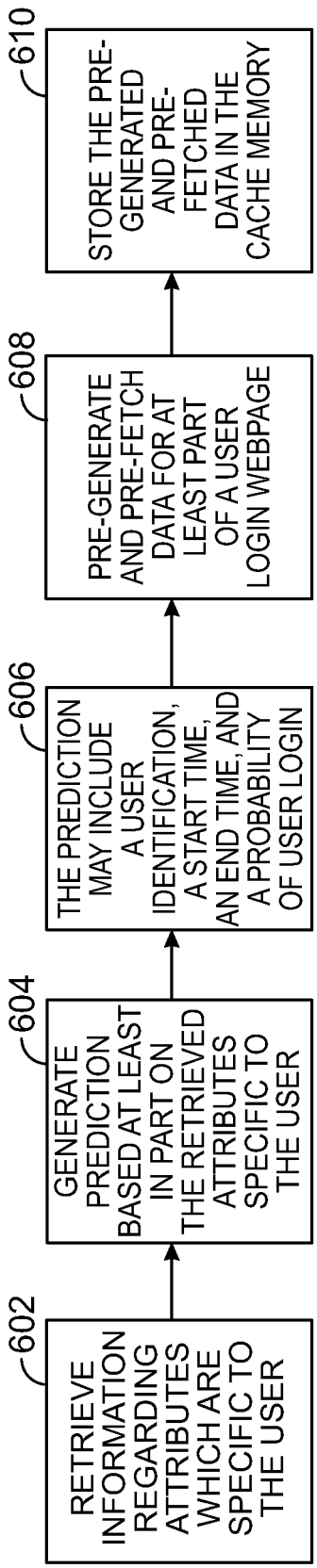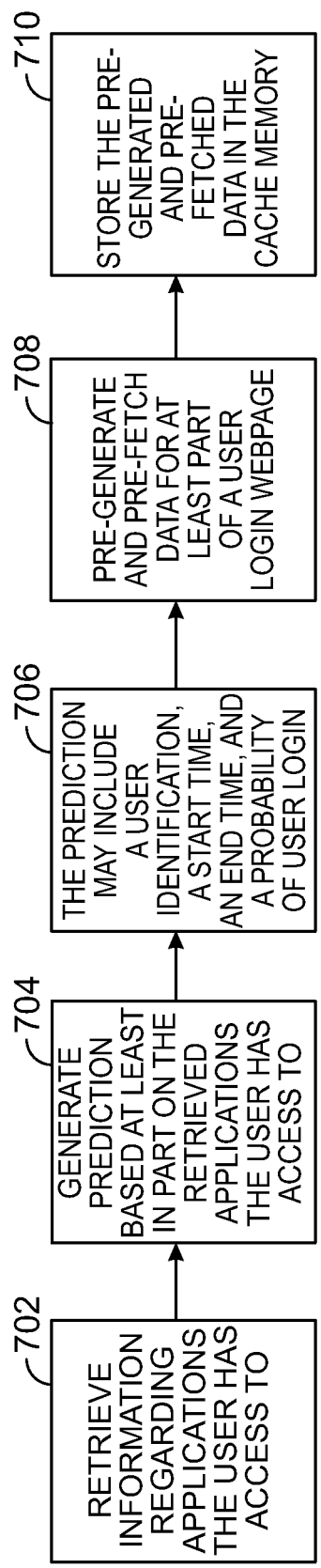
FIG. 6
FIG. 7

METHOD AND APPARATUS FOR PREDICTIVE ANALYSIS FOR PRE-FETCHING DATA

FIELD OF TECHNOLOGY

This invention relates to predicative analysis for pre-fetching data.

BACKGROUND OF THE DISCLOSURE

Many users log into webpages in order to view personal information. For example, many users log into an online banking portal in order to view personal bank activity or to make transactions. In order to load a webpage with a specific user's information, the website may be required to contact a number of different resources and retrieve the pertinent information regarding that specific customer. This retrieval of information may be time consuming. The retrieval of information may cause the webpage to take a considerable amount of time to load the relevant information. If the webpage takes a considerable amount of time to load, the user may become frustrated.

Many users log into the same webpages at about the same time every day. This may be because many users require, or become accustomed to receiving, specific information at, or about, a specific time every day. This may also be because users get into a habit of viewing specific information at a specific time every day.

SUMMARY OF THE INVENTION

An apparatus for predictive analysis for determining what point in time, or on what schedule to pre-fetch data is provided. The apparatus may include a processor. The processor may be configured to generate a prediction. The prediction may correspond to a time in which there exists a high probability of a user login to a webpage. The prediction may include a user identification, a start time of a potential login window, an end time of a potential login window, and a probability of user login. The apparatus may also include a cache memory. The processor may be further configured to pre-generate and/or pre-fetch data, in response to the prediction. The data may be for populating at least part of a user login webpage. The processor may be further configured to store the data in the cache memory. The processor may be further configured to update the data stored in cache memory.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows an illustrative flow chart in accordance with the principles of the invention.

FIG. 3 shows an illustrative flow chart in accordance with the principles of the invention.

FIG. 4 shows an illustrative flow chart in accordance with the principles of the invention.

FIG. 5 shows an illustrative flow chart in accordance with the principles of the invention.

FIG. 6 shows an illustrative flow chart in accordance with the principles of the invention.

FIG. 7 shows an illustrative flow chart in accordance with the principles of the invention.

DETAILED DESCRIPTION OF THE DISCLOSURE

Figure 1:
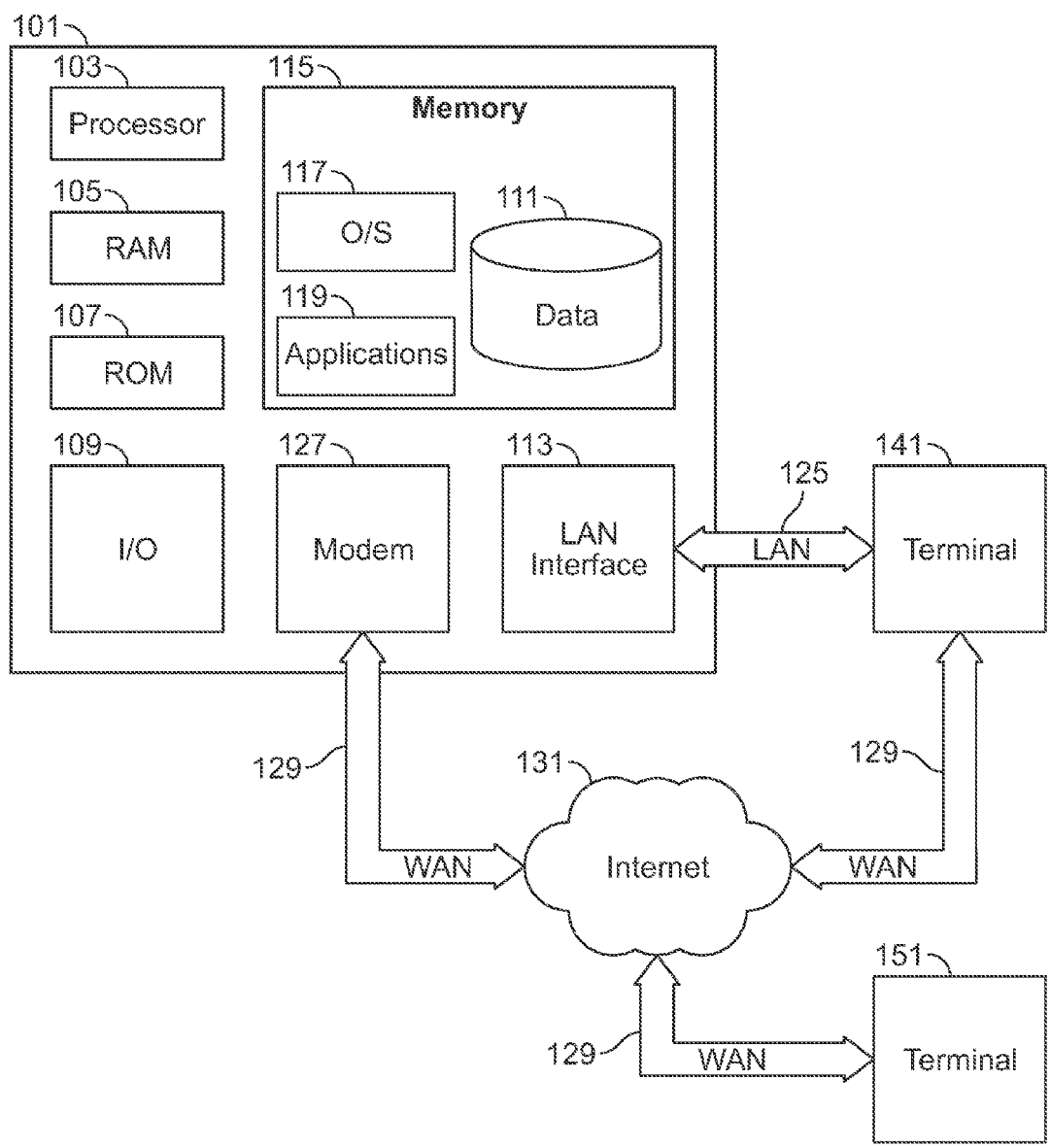
FIG. 1 shows an illustrative apparatus in accordance with principles of the invention.

Apparatus and methods for predictive analysis for pre-fetching and/or pre-generating data is provided. Such apparatus and methods may include computer hardware and software that are compatible with the internet, the worldwide web, pre-fetching data for a user login and/pr pre-generating data for a user login.

The apparatus may include a processor. The processor may be configured to generate a prediction. The prediction may correspond to a user login to a webpage. The prediction may include a user identification, a start time of a potential login window, an end time of a potential login window, and a probability of user login.

The apparatus may also include a cache memory.

The processor may be further configured to pre-fetch and/or pre-generate data in response to the prediction. The data may be data corresponding to, at least in part, an updated user login webpage.

The processor may pre-fetch the data to be stored in the cache memory.

The processor may pre-fetch the data, and in response to pre-fetching the data, pre-generate data based on the pre-fetched data. The pre-generated data may be stored in cache memory. The pre-generated data may be data which can be used for reports on a user login webpage.

The processor may be further configured to update the data which may be stored in the cache memory.

The prediction may be based in part on the user's prior login history. For example, if a user logs in to a banking portal, a personal or corporate banking portal, at about 9:00 AM every morning, then the prediction may take into account that at or about 9:00 AM the user may access his account. The system may pre-fetch the data for the user's banking portal at approximately 9:00 AM every morning. The system may save the pre-fetched data in cache memory. The system may also ensure that the data is current for a window of time. The data may be kept current either by updating the data when a change occurs to the data, or updating the data after a pre-determined period of time.

The prediction may also be based in part on calendar data. The system may include an override for weekends, holidays, and special events. For example, the user may typically not log in to his portal on a legal holiday, or on a day in which his company is hosting a special event e.g. a firm recreational day. The system may include a receiver which receives calendar information. The override may be generated based on the calendar information. On days in which the probability of user login is low, the override will instruct the system may not pre-fetch the data.

Also, the user may log in to his portal at a later time on an election day. In some embodiments, the system may include an override for a day in which there is a high probability that the user will login at a later time. The system may include a receiver which receives sent email information. If the system recognizes that the user sent an email from his home computer at a time in which the system would expect the user to be in a vehicle commuting to his work office, the system may generate an override. The override may include the expected arrival time of the user. The override may be able to determine the expected time of the user because the system may have access to the user's email account. The system may be configured to recognize an email that contains the words "I will be late; I will be in the office at 10:30 this morning", or any other similar phrases. The system may recognize that the user will be in the office at 10:30 AM. The system may pre-fetch the data at approximately 10:30 AM. The system may also be configured to recognize that if the user typically logs into his account 10 minutes after he arrives at work at 9:00 AM, the system will pre-fetch the data and keep the data updated for approximately 10 minutes, or other suitable time, after the user is expected to arrive at work.

The prediction may also be based in part on the user's location. In some embodiments, the system may include an override for such a day which there is a hurricane in the user's current geographical location. The system may be aware of the hurricane because the system may be in communication with a radio station. The system may include a receiver which is configured to receive data from a radio station. The data which may be received from the radio station may include information regarding a hurricane and the zip codes, or other suitable information such as a digital satellite map that may be affected. The system may then generate an override which may halt the system from pre-fetching data for users which are in hurricane-affected zip code locations. The system may be aware of which users are in hurricane affected zip code locations, because the system may require a user to enter his address when he joins the system.

In other embodiments, the system may include an override for a day in which there is heavy traffic in the user's geographical area. The system may be aware of the traffic because the system may be in communication with a radio station. The system may also be aware of a user's current geographical location, because the user may have a GPS tracking device in the vehicle he is occupying, and the system may in communication with the GPS tracking device as well. The system may determine which users are in traffic, and in what amount of time they can be expected to arrive, because the system may compare the user's geographical location to the geographical locations which the radio station has determined to be congested, and the amount of traffic that the location has. The system may generate an override for a user which will log in to his account at a later time due to traffic. The override may halt the system from pre-fetching the data at the regular time and instruct the system to pre-fetch the data at a later time depending on when the user can be expected to log in based on the traffic conditions.

In yet other embodiments, the system may include and override for events which are not on a calendar. These events may include inclement weather, regulation, business driven deadlines, tax, quarterly earnings, and summits. The system may be aware of this information because the system may have access to the user's personal task managing software. The system may also be aware of this information because the system may have access to the user's personal bookkeeping software. For example, a user may not login to his banking portal on a day in which he has a business deadline. This may be because the user does not have time to view his banking portal. The system may be aware of this deadline because the user had previously placed a note in his task manager software regarding this deadline.

Also, a user may log in to his banking portal more often on a day in which taxes are due. This may be because a user may need to view his account balances in order to make his tax payments. The system may be aware of a day in which taxes are due because the system may be in communication with the user's bookkeeping software. The system may pre-fetch data for the user's banking portal more often on a day in which taxes are due.

In yet other embodiments, the system may include an override for a day which a specific current event has occurred in the user's geographical location. The system may be aware of this information because the system may be receiving live information from internet sources which may inform the system of current events in the user's geographical location. For example, a user may not login to his portal on a day in which a terrorist attack has occurred in his current location. Also a user in a country which is governed by a monarchy may not login to his portal on the day in which the country's new monarch is coroneted. The system may receive information regarding the user's geographical location and the current events of the user's geographical location. The system may generate an override based on the received information. The override may instruct the system to halt the pre-fetching of the data for a specific day.

In yet other embodiments, the system may include an override based on attributes which are specific to the user. The system may be aware of attributes which are specific to the user, because the system may have permissions to mine the computer for information regarding the user. The override may be based on at least in part, the business type, the total number of users in the application from that entity, the user management model, the entitlement change pattern, and the daily approval volume. The override may instruct the system to halt the pre-fetching of data for a day in which the system has determined that the user will not log in to his account. The override may also instruct the system to pre-fetch the data more often on a day in which the system determined that the user may log in to his account more often.

In yet other embodiments, the system may include an override based on applications in which the user has access. The system may be aware of the application in which the user has access because the system may have permission to mine the data from the user's computer. The override may be based, at least in part, of the roles, activities, permissions, and entitlements in the application, the type of application, and application-driven deadlines. For example, a user may log in to a portal at a specific point in time if the user is granted permission to access a specific webpage in that portal. Therefore, the override may instruct the system to pre-fetch data for the user's portal at the specific time in which the user has been granted permission to view the portal.

In other embodiments, the system may include an override based in part on the transaction status in various applications and probability the user will login to check, approve, reject, or report the transactions. The system may be aware of the transaction status in various applications because the system may have permission to mine the computer for the data pertaining to the transaction status. For example, a user may log in to a banking portal in order to electronically pay a bill which may be due within a short window of time. Also, a user may log in to a banking portal in order to approve a transaction that may need the user's approval within a short window of time. The system may be aware of which bills need to be paid within a specific time constraint. The override may pre-fetch the user's banking portal data when the system expects the user to login in order to pay a bill that is due.

The processor may also be configured to update the cached data in the event that there is a change to the cached data. Any event that changes the cached data may result in re-generation of the data in the cache memory.

The processor may also be configured to update the cached data upon the lapse of a predetermined time period. The predetermined time period may be for example sixty seconds. The user's data may be re-generated or re-fetched in the cache memory after the predefined time interval. This may continue for the duration of the potential login window of time.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software/firmware embodiment or an embodiment combining software, firmware, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, EEPROM, Flash memory, SRAM, DRAM, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

FIG. 1 is an illustrative block diagram of mobile device system 100 based on a computer 101. The computer 101 may have a processor 103 for controlling the operation of the mobile device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other mobile device systems via a LAN interface 113.

System 100 may operate in a networked environment supporting connections to one or more remote computers, such as terminals 141 and 151. Terminals 141 and 151 may be personal computers or servers that include many or all of the elements described above relative to mobile device system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other mobile devices. These mobile devices may be identical to mobile device system 100 or different. The differences may be related to hardware components and/or software components.

FIG. 2 shows an illustrative flowchart. Step 202 shows the retrieval of historical information pertaining to a specific user. Step 204 shows generating a prediction based at least in part on a user's historical login information. Step 206 shows that the prediction may include a user identification, a start time of a potential login window, and end time of a potential login window, and a probability of a user login. Step 208 shows the pre-generating and pre-fetching data for at least part of a user login webpage. Step 210 shows the storing pre-generated and pre-fetched data in cache memory.

FIG. 3 shows an illustrative flowchart. Step 302 shows the retrieval of information regarding a calendar. Step 304 shows the generating a prediction based at least in part on the retrieved calendar. Step 306 shows the prediction may include a user identification, a start time of a potential login window, an end time of a potential login window, and a probability of user login. Step 308 shows pre-generating and pre-fetching data for at least part of a user login webpage. Step 310 shows storing the pre-generated and pre-fetched data in cache memory.

FIG. 4 shows an illustrative flowchart. Step 402 shows retrieval of information regarding the user's location. Step 404 shows generating prediction based at least in part on the user's location. Step 406 shows the prediction may include a user identification, a start time of a potential login window, an end time of a potential login window, and a probability of user login. Step 408 shows pre-generating and pre-fetching data for at least part of a user login webpage. Step 410 shows storing the pre-generated and pre-fetched data in cache memory.

FIG. 5 shows an illustrative flow chart. Step 502 shows retrieval of information regarding the current events of the user's location. Step 504 shows generating prediction based at least in part on the user's location. Step 506 shows the prediction may include a user identification, a start time of a potential login window, an end time of a potential login window, and a probability of user login. Step 508 shows pre-generating and pre-fetching data for at least part of a user login webpage. Step 510 shows the storing of the pre-generated and pre-fetched data in cached memory.

FIG. 6 shows an illustrative flow chart. Step 602 shows the retrieval of information regarding attributes which are specific to the user. Step 604 shows generating a prediction based at least in part on the retrieved attributes specific to the user. Step 606 shows the prediction may include a user identification, a start time of a potential login window, an end time of a potential login window, and a probability of user login. Step 608 shows pre-generating and pre-fetching data for at least part of a user login webpage. Step 610 shows storing the pre-generated and pre-fetched data in cache memory.

FIG. 7 shows an illustrative flow chart. Step 702 shows the retrieval of information regarding applications the user has access to. Step 704 shows generating a prediction based at least in part on the retrieved applications the user has access to. Step 706 shows the prediction may include a user identification, a start time of a potential login window, an end time of a potential login window, and a probability of user login. Step 708 shows pre-generating and pre-fetching data for at least part of a user login webpage. Step 710 shows storing the pre-generated and pre-fetched data in cache memory.

Figure 8:
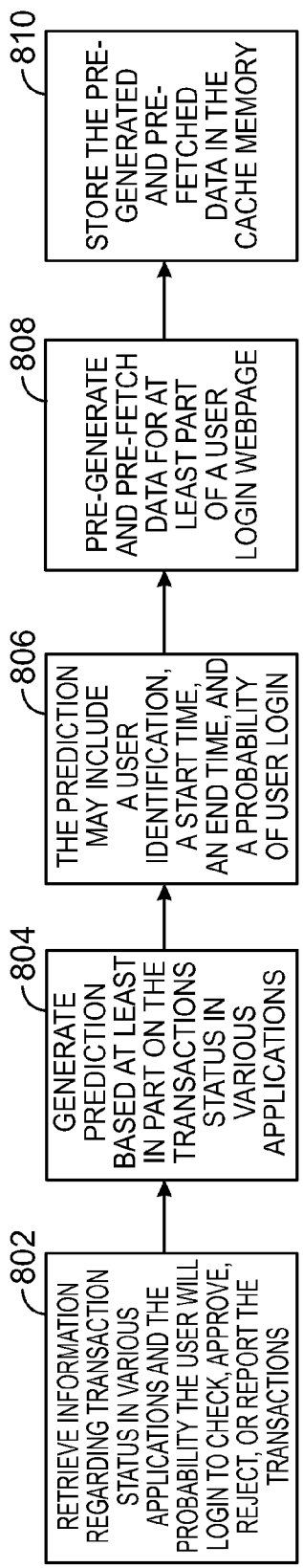
FIG. 8 shows an illustrative flow chart in accordance with the principles of the invention.

FIG. 8 shows an illustrative flow chart. Step 802 shows the retrieval of information regarding transaction status in various applications and the probability the user will login to check, approve, reject, or report the transactions. Step 804 shows generating a prediction based at least in part on the transaction status in various applications. Step 806 shows the prediction may include a user identification, a start time of a potential login window, an end time of a potential login window, and a probability of user login. Step 808 shows pre-generating and pre-fetching data for at least part of a user login webpage. Step 810 shows storing the pre-generated and pre-fetched data in cache memory.

Figure 9:
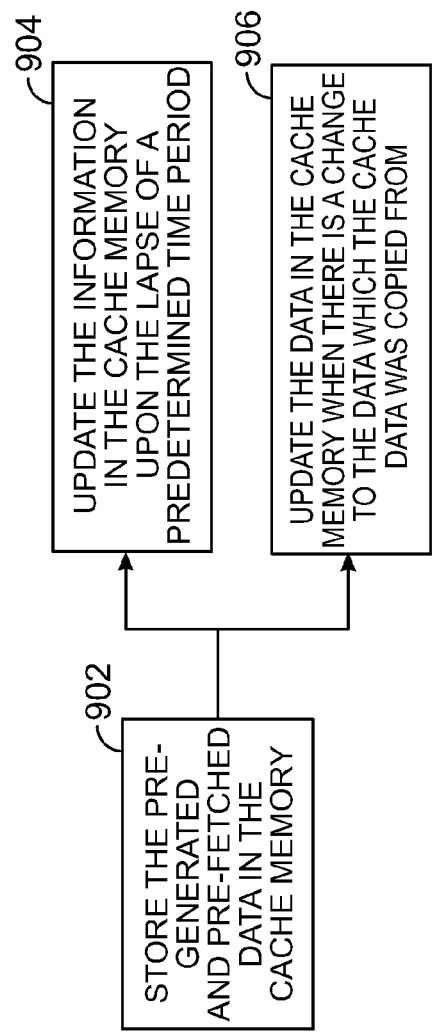
FIG. 9 shows an illustrative flow chart in accordance with the principles of the invention.

FIG. 9 shows an illustrative flow chart. Step 902 shows the storing the pre-fetched and pre-generated data in cache memory. Step 904 shows the updating of the data in the cache memory upon the lapse of a predetermined time period. Step 910 shows the updating the data in cache memory when there is a change to the data which the cached data was copied from.

Figure 10:
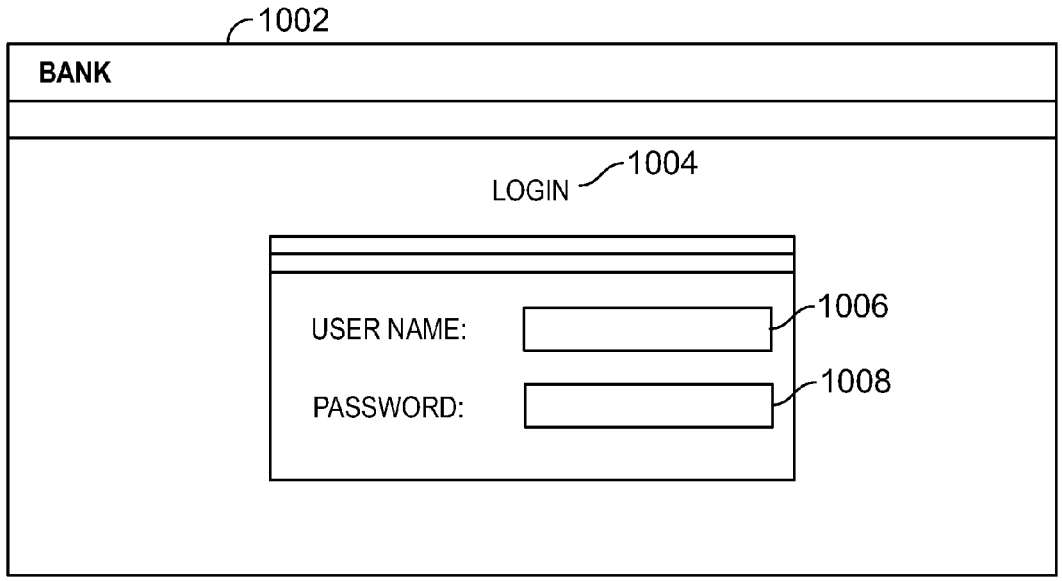
FIG. 10 shows an illustrative graphical user interface ("GUI") in accordance with the principles of the invention.

FIG. 10 shows an illustrative GUI. GUI 1002 shows login 1004 in which a user can login to a webpage. The user is required to enter the username into text field 1006 and the password into text field 1008 in order to access the webpage.

Figure 11:
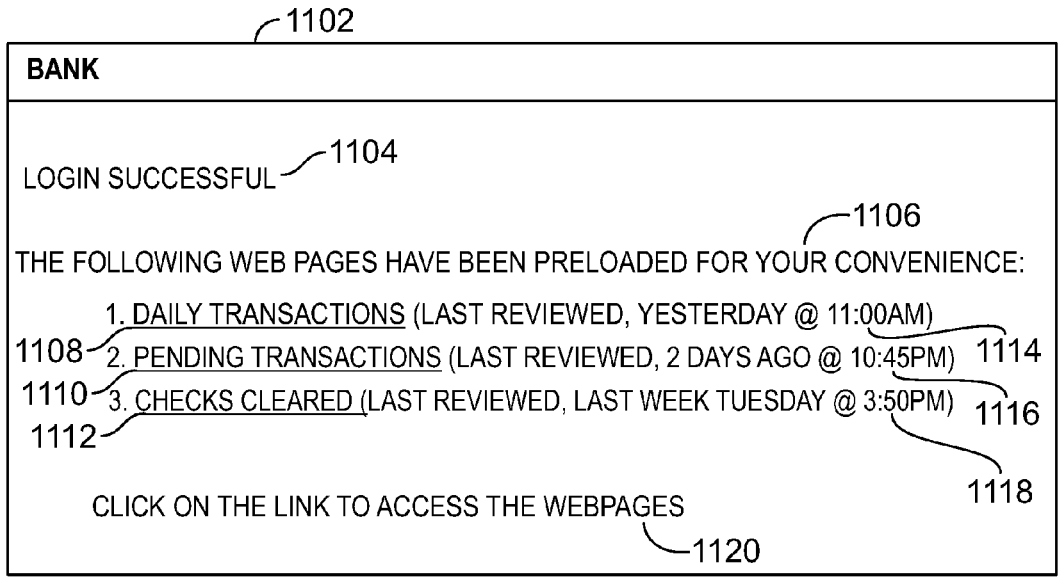
FIG. 11 shows an illustrative GUI in accordance with the principles of the invention.

FIG. 11 shows an illustrative GUI. GUI 1102 shows a bank screen in which a user is able to choose from web pages where the data has been pre-fetched and pre-loaded into cache memory. Text 1104 shows that the login has been successful. Text 1106 shows that the webpages listed below have been preloaded for the user's convenience. Hyperlink 1108 allows the user to follow the link to the daily transactions page. Text 1114 gives the user the information relating to when the daily transactions page has been last viewed. Hyperlink 1110 allows the user to follow the link to the pending transactions page. Text 1116 gives the user the information as to when the pending transactions page has been last viewed. Hyperlink 1112 allows the user to follow the link to the checks cleared page. Text 1118 gives the user the information as to when the checks cleared page has been last viewed. Text 1120 instructs the user to click on one or more of the hyperlinks to access the webpages.

Thus, methods and apparatus for predictive analysis are provided. Persons skilled in the art will appreciate that the present invention can be practiced by other than the described embodiments, which are presented for purposes of illustration rather than of limitation, and that the present invention is limited only by the claims that follow.

What is claimed is:

1. Apparatus for predictive analysis for determining which data to pre-fetch at a specific point in time comprising:
   a processor which is configured to generate a prediction corresponding to a user login to a webpage;
   the prediction comprising:
       a user identification,
       a start time of a potential login window,
       an end time of a potential login window,
       a probability of user login;
   the prediction being based, at least in part, on a calendar;
   a cache memory;
   the processor further configured to pre-generate and/or pre-fetch, in response to the prediction, data for at least part of a user login webpage and store the data in the cache memory;
   the processor further configured to update the data stored in cache; and
   the processor further configured to generate an override, said override configured to halt the processor from pre-generating and/or pre-fetching data, said override being based on an unforeseeable event.

2. The apparatus of claim 1 wherein the prediction is based, at least in part, on the user's location.

3. The apparatus of claim 1 wherein the unforeseeable event is a hurricane.

4. The apparatus of claim 1 wherein the unforeseeable event is a terror attack.

5. The apparatus of claim 1 wherein the unforeseeable event is a coronation of a monarch.

6. The apparatus of claim 1 wherein the unforeseeable event is heavy traffic in the user's geographical area.

7. A method for performing predictive analysis for determining which data to pre-fetch at a specific point in time, said method comprising:
   generating, by a processor, a prediction corresponding to a user login webpage, said prediction being based at least in part on a calendar, said prediction comprising:
       a user identification;
       a start time of a potential login window;
       an end time of a potential login window;
       a probability of user login;
   pre-generating and/or pre-fetching, by the processor, in response to the prediction, data for at least part of a user login webpage;
   storing the pre-generated and/or pre-fetched data in a cache memory;

updating, by the processor, the data stored in cache memory;

generating, by the processor, an override, said override configured to halt the processor from pre-generating and/or pre-fetching data, said override being based on an event that is unforeseeable at the time of the prediction.

8. The apparatus of claim 7 wherein the prediction is based, at least in part, on the user's location.

9. The apparatus of claim 7 wherein the unforeseeable event is a hurricane.

10. The apparatus of claim 7 wherein the unforeseeable event is a tenor attack.

11. The apparatus of claim 7 wherein the unforeseeable event is a coronation of a monarch.

12. The apparatus of claim 7 wherein the unforeseeable event is heavy traffic in the user's geographical area.

\* \* \* \* \*